United States Patent
Liu et al.

(10) Patent No.: US 6,844,402 B1
(45) Date of Patent: Jan. 18, 2005

(54) PREPARATION OF OLEFIN-ACRYLIC COPOLYMERS WITH LATE TRANSITION METAL CATALYSTS

(75) Inventors: Jia-Chu Liu, Mason, OH (US); Mark P. Mack, West Chester, OH (US); Shao-Hua Guo, Exton, PA (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 10/733,631

(22) Filed: Dec. 11, 2003

(51) Int. Cl.[7] .................................................. C08F 4/52
(52) U.S. Cl. ........................ 526/134; 526/141; 526/147; 526/161; 526/169.1; 526/172
(58) Field of Search ................. 526/134, 141, 526/147, 161, 169.1, 172

(56) References Cited

U.S. PATENT DOCUMENTS

| | | | |
|---|---|---|---|
| 4,990,640 A | 2/1991 | Tsutsui et al. | 556/181 |
| 5,153,157 A | 10/1992 | Hlatky et al. | 502/117 |
| 5,198,401 A | 3/1993 | Turner et al. | 502/155 |
| 5,241,025 A | 8/1993 | Hlatky et al. | 526/129 |
| 5,414,180 A | 5/1995 | Geerts et al. | 585/525 |
| 5,543,377 A | 8/1996 | Tsutsui et al. | 502/125 |
| 5,648,440 A | 7/1997 | Sugano et al. | 526/132 |
| 5,714,556 A | 2/1998 | Johnson et al. | 526/135 |
| 5,866,663 A | 2/1999 | Brookhart et al. | 526/170 |
| 5,955,555 A | 9/1999 | Bennett | 526/133 |
| 6,127,497 A | 10/2000 | Matsunaga et al. | 526/141 |
| 6,211,311 B1 | 4/2001 | Wang et al. | 526/131 |
| 6,310,165 B1 | 10/2001 | Wang | 526/348 |
| 6,340,771 B1 | 1/2002 | Hoang et al. | 556/171 |
| 6,501,000 B1 | 12/2002 | Stibrany et al. | 585/511 |
| 6,506,859 B1 | 1/2003 | Patil et al. | 526/164 |
| 6,515,071 B1 | 2/2003 | Riley et al. | 525/44 |
| 6,562,973 B1 | 5/2003 | Liu | 546/12 |
| 6,620,759 B2 | 9/2003 | Johnson et al. | 502/129 |
| 6,693,154 B2 * | 2/2004 | Liu et al. | 526/134 |

* cited by examiner

Primary Examiner—William K. Cheung
(74) Attorney, Agent, or Firm—Shao-Hua Guo

(57) ABSTRACT

A process for making olefin-acrylic copolymers is disclosed. The process comprises polymerizing an olefin and an acrylic monomer in the presence of an activator and a Group 8–10 late transition metal complex. The late transition metal catalyst contains an isoindoline ligand.

19 Claims, No Drawings

PREPARATION OF OLEFIN-ACRYLIC COPOLYMERS WITH LATE TRANSITION METAL CATALYSTS

FIELD OF THE INVENTION

The invention relates to olefin-acrylic copolymers. More particularly, the invention relates to preparation of olefin-acrylic copolymers with late transition metal catalysts.

BACKGROUND OF THE INVENTION

Currently, specialty polyolefins, such as ethylene-methyl methacrylate (EMA), ethylene-ethyl acrylate (EEA), ethylene-butyl acrylate (EBA), and ethylene-acrylic acid (EAA) are made by high temperature, high pressure free radical polymerizations. These polymers have been used in medical packaging, disposable gloves, cable compounding, adhesives, and many other applications. However, these materials are expensive.

Since the late 1990s, olefin polymerization catalysts that incorporate late transition metals (especially iron, nickel, or cobalt) and bulky α-diimine ligands (or "bis(imines)") have been investigated. These late transition metal catalysts are of interest because, unlike the early transition metal metallocenes or Ziegler catalysts, the late transition metal catalysts can tolerate and incorporate polar comonomers into polyolefins. See U.S. Pat. Nos. 5,866,663 and 5,955,555.

Recently, new late transition metal catalysts that contain isoindoline ligands have been developed. See co-pending application Ser. No. 09/947,745, filed on Sep. 6, 2001. These catalysts have showed higher activity than the bis(imines)-based late transition catalysts. Moreover, these catalysts are relatively easy to prepare. However, these catalysts have not been explored for the use in the preparation of olefin-acrylic copolymers.

Compared to the conventional free radical polymerization, late transition metal catalysts have great ability in tailoring of critical polymer properties: molecular weight, crystallinity or melting point, and polydispersity. Therefore, the late transition metal catalysts may provide better product quality and production consistency. Also, the late transition metal catalysts do not require high temperature and high pressure polymerization. They avoid the use of explosive peroxides. Thus, the late transition metal catalyst polymerization may provide a safer and more cost-effective alternative to the existing free radical technology.

In summary, exploring new methods for the preparation of olefin-acrylic copolymers is important to the industry. More particularly, the methods would use the newly developed late transition metal catalysts. Ideally, the catalysts would not only be able to tolerate the acrylic comonomers but also have high activity and be easy to make.

SUMMARY OF THE INVENTION

The invention is a process for making olefin-acrylic copolymers. The process uses a late transition metal catalyst. The catalyst comprises an activator and a late transition metal complex that contains an isoindoline ligand.

DETAILED DESCRIPTION OF THE INVENTION

The process of the invention comprises polymerizing an olefin and an acrylic monomer in the presence of an activator and a Group 8–10 late transition metal complex. The complex contains an isoindoline ligand. The activator interacts with the complex to produce catalytically active species.

Suitable late transition metal complexes include those which have the general structure:

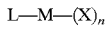

M is a Group 8–10 late transition metal; L is an isoindoline ligand; X is a labile ligand, n, the number of X ligands, is greater than or equal to 1.

Preferably, the M is selected from the group consisting of Fe, Co, Ni, Cu and Zn. More preferably, the M is selected from the group consisting of Fe, Co, and Ni. Most preferably, the M is Fe.

The isoindoline ligand preferably has the general structure:

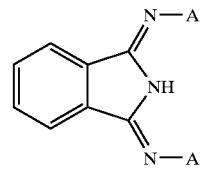

When forming a late transition metal complex, the hydrogen of the N—H group may be removed to form an ionic bonding between the nitrogen and the late transition metal. Optionally, the aromatic ring hydrogen atoms of the is above structure are independently substituted. Suitable ring substitute groups include alkyl, aryl, aralkyl, alkylaryl, silyl, halogen, alkoxy, aryloxy, siloxy, nitro, dialkyl amino, diary amino groups, and the like.

A is an aryl or a heteroaryl group. When A is aryl, it preferably is phenyl- or alkyl-substituted, such as 4-methylphenyl or 2,4,6-trimethylphenyl (2-mesityl). When A is heteroaryl, it is preferably 2-pyridyl, 2-pyrimidinyl, 4-pyrimidinyl, 2-pyrazinyl, 2-imidazolyl, 2-thiazolyl, or 2-oxazolyl. The aryl and heteroaryl groups can be fused to other rings, as in a 2-naphthyl, 2-benzothiazolyl or 2-benzimidazolyl group.

A few exemplary isoindolines appear below:

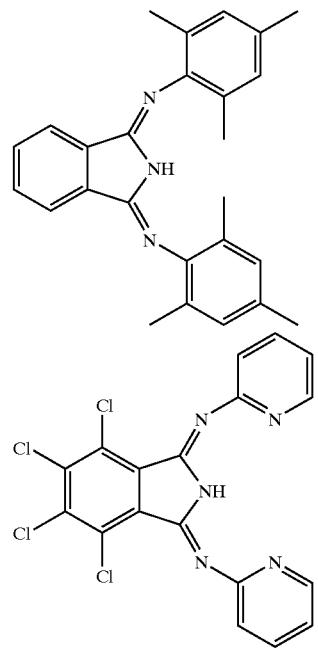

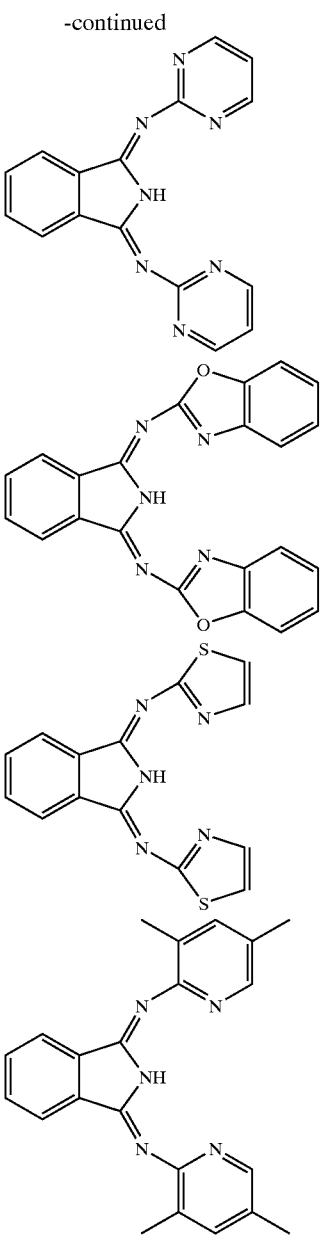

Preferably, the X is independently selected from the group consisting of hydrogen and halides. More preferably, X is a halide. Most preferably, X is chloride.

Suitable activators include alumoxane and alkylaluminum compounds. Examples of suitable alumoxane compounds include methyl alumoxane (MAO), polymeric MAO (PMAO), ethyl alumoxane, diisobutyl alumoxane, and the like. Examples of suitable alkylaluminum compounds include triethylaluminum, diethyl aluminum chloride, trimethylaluminum, triisobutyl aluminum, and the like. Suitable alumoxane compounds also include those that are modified. Methods for the modification of alumoxanes are known. For instance, U.S. Pat. No. 4,990,640 teaches the modification of alumoxanes with active hydrogen-containing compounds such as ethylene glycol. U.S. Pat. No. 6,340,771 teaches modifying MAO with sugar to make "sweet" MAO. Also, U.S. Pat. No. 5,543,377 teaches modifying alumoxanes with ketoalcohols and β-diketones. The teachings of these U.S. patents are incorporated herein by reference.

Suitable activators also include acid salts that contain non-nucleophilic anions. These compounds generally consist of bulky ligands attached to boron or aluminum. Examples include lithium tetrakis(pentafluorophenyl) borate, lithium tetrakis-(pentafluorophenyl) aluminate, anilinium tetrakis(pentafluorophenyl)borate, and the like.

Suitable activators further include organoboranes, which are compounds of boron and one or more alkyl, aryl, or aralkyl groups. Suitable organoboranes include substituted and unsubstituted trialkyl and triarylboranes such as tris(pentafluorophenyl)borane, triphenylborane, tri-n-octylborane, and the like. Suitable organoborane activators are described in U.S. Pat. Nos. 5,153,157, 5,198,401, and 5,241,025. The teachings of these U.S. patents are incorporated herein by reference. Suitable activators also include aluminoboronates, which are the reaction products of alkyl aluminum compounds and organoboronic acids. These activators are described in U.S. Pat. Nos. 5,414,180 and 5,648,440, the teachings of which are incorporated herein by reference.

The late transition metal complex, the activator, or both are optionally supported onto an inorganic solid or organic polymer support. Suitable supports include silica, alumina, silica-aluminas, magnesia, titania, clays, zeolites, or the like. The support is preferably treated thermally, chemically, or both prior to use to reduce the concentration of surface hydroxyl groups. Thermal treatment consists of heating (or "calcining") the support in a dry atmosphere at elevated temperature, preferably greater than about 100° C., and more preferably from about 150° C. to about 600° C., prior to use. A variety of different chemical treatments can be used, including reaction with organo-aluminum, -magnesium, -silicon, or -boron compounds. See, for example, the techniques described in U.S. Pat. No. 6,211,311.

Suitable olefins include α-olefins, cyclic olefins, conjugated dienes, and mixtures thereof. $C_2$–$C_{20}$ α-olefins are preferred. Ethylene, propylene, 1-butene, 1-pentene, 1-hexene, 1-octene, and mixtures thereof are particularly preferred. Ethylene and propylene are most preferred.

Suitable acrylic monomers include $C_1$–$C_{20}$ alkyl acrylates, $C_1$–$C_{20}$ alkyl methacrylates, $C_6$–$C_{20}$ aryl acrylates, $C_6$–$C_{20}$ aryl methacrylates, the like, and mixtures thereof. Examples of suitable acrylic monomers are n-butyl acrylate, n-butyl methacrylate, methyl methacrylate, t-butyl methacrylate, iso-butyl methacrylate, benzyl methacrylate, cyclohexyl methacrylate, and mixtures thereof.

The processes can be performed in slurry, solution, gas phase, or bulk, or a combination of these. Solution and slurry processes are preferred. The polymerizations can be performed over a wide temperature range, such as about −30° C. to about 280° C. A more preferred range is from about 30° C. to about 180° C.; most preferred is the range from about 50° C. to about 150° C.

Molar ratio of olefin/acrylic monomer is preferably within the range of 99/1 to 50/50. More preferably, the ratio is within the range of 95/5 to 75/25. Polymers made by the process of the invention have many applications as acrylic functionalized polyolefin. They can be used for making films. They can also be used for adhesives.

Examples of olefin-acrylic copolymers which can be made by the process of the invention include ethylene-methyl methacrylate (EMA), ethylene-ethyl acrylate (EEA), ethylene-butyl acrylate (EBA), propylene-methyl methacrylate, and the likes. These polymers have found many applications such as in medical packaging, disposable gloves, and cable compounding.

The following examples merely illustrate the invention. Those skilled in the art will recognize many variations that are within the spirit of the invention and scope of the claims.

EXAMPLE 1

Copolymerization Of Ethylene And n-Butyl Acrylate With Iron(II) 1,3-Bis(2-Mesitylimino) isoindoline Complex And Mao Activator Catalyst Preparation A 100-mL round-bottom flask equipped with a nitrogen inlet and an internal fritted-glass filter is charged with phthalimide (2.94 g, 20.0 mmol) and ethyl acetate (60 mL). (The fritted-glass filter is attached to the end of a glass tube, which is inserted into the reactor through a rubber septum. The filter is easily raised above or lowered below the surface of liquids in the reactor.) 2,4,6-Trimethylaniline (5.41 g, 40.0 mmol, 2.0 eq.) and iron(II) chloride (2.54 g, 20.0 mmol) are added to the flask, and the mixture is stirred under nitrogen at room temperature for 1 h. The yellow mixture is heated to reflux (77° C.) for 10 h, and is then stirred at room temperature for 32 h. A brown precipitate forms. The reaction mixture is concentrated by stripping out the ethyl acetate under a stream of nitrogen. Cold diethyl ether (30 mL) is added to the residue, and the mixture is stirred to wash the residue. The glass filter is immersed in the liquid phase, which is then removed at reduced pressure through the internal filter. The solids are dried under vacuum for 2 h to give a brown powder. Yield: 10.11 g (99.4%).

Polymerization

The polymerization is performed in an Endeavor (Advantage™ Series 3400 Process Chemistry Workstation, made by Argonaut Technologies, Inc.). The Endeavor contains eight pressure reactor tubes each with individual temperature, pressure, stirring, and injection controls. The Endeavor is placed in a glove box for manual manipulations and an inert atmosphere of nitrogen. A pre-programmed computer monitors and collects data on pressure, temperature, ethylene consumption in each reactor tube as a function of the reaction time.

A reactor tube (10 mL) is charged with n-butyl acrylate (4 mL), tri-isobutyl aluminum (0.1 mL, 1.0 M hexane solution), MAO (0.08 mL, 1.0 M toluene solution), and the catalyst (0.2 mL, 1.0 M toluene solution). The reactor tube is then sealed. The reactor is pressured with ethylene to 400 psig and heated to 100° C. The polymerization continues at these temperature and pressure readings for about an hour with continuous feeding of ethylene. The ethylene consumption is about 0.73 gram (0.026 mole). After polymerization, unreacted acrylate is removed by vacuum, yielding 1.8 grams of polymer. The polymer has an acrylate/ethylene molar ratio: 1:3.1 (calculated based on the monomer consumption); Mw: $2.1 \times 10^5$; and Mn: $8.8 \times 10^3$.

EXAMPLE 2

Copolymerization Of Ethylene And n-Butyl Acrylate With Iron(II) 1,3-Bis(2-pyridylimino) isoindoline Complex and MAO Activator Catalyst Preparation A 100-mL round-bottom flask equipped with a nitrogen inlet and an internal fritted-glass filter is charged with phthalimide (2.94 g, 20.0 mmol) and ethyl acetate (50 mL). 2-Aminopyridine (3.77 g, 40.0 mmol, 2.1 eq.) and iron(II) chloride (2.54 g, 20.0 mmol) are added to the flask, and the mixture is stirred under nitrogen at room temperature for 1 h. The mixture is stirred at room temperature for 120 h, yielding a white precipitate.

Samples are removed from the bottom of the flask at 24, 48, and 120 h. Each sample is dried under vacuum for 0.5 h, and a small portion of each (40 mg) is dissolved in toluene (20 mL) and tested in an ethylene polymerization experiment. (Polymerization results for the 24 h sample appear in Table 1.), The rest of the reaction mixture is stripped under vacuum after the 120 h stirring period. After washing with cold diethyl ether (3×20 mL), the white solids are dried under vacuum for 1 h. Total yield: 8.40 g (98.6%).

Polymerization

The polymerization procedure of Example 1 is followed. The ethylene consumption 0.59 gram (0.021 mole), and 1.7 grams of polymer is collected. The polymer has an acrylate/ethylene molar ratio: 1:2.4; Mw: $1.9 \times 10^5$; and Mn: $8.5 \times 10^3$.

EXAMPLE 3

Copolymerization Of Ethylene And n-Butyl Acrylate With Nickel(II) 1,3-Bis(2-mesitylimino) isoindoline Complex and MAO Activator Catalyst Preparation A 100-mL round-bottom flask equipped as described earlier is charged with phthalimide (2.94 g, 20.0 mmol) and ethyl acetate (60 mL). 2,4,6-Trimethylaniline (5.41 g, 40.0 mmol, 2.0 eq.) and nickel(II) chloride (2.63 g, 20.0 mmol) are added to the flask, and the mixture is stirred under nitrogen at room temperature for 24 h. A brown precipitate forms. The reaction mixture is concentrated by stripping out the ethyl acetate under a stream of nitrogen. Cold diethyl ether (30 mL) is added to the residue, and the mixture is stirred to wash the residue. The liquid phase is removed at reduced pressure through the internal filter. The solids are dried under vacuum for 2 h to give a brown powder. Yield: 9.60 g (93.8%).

Polymerization

The polymerization procedure of Example 1 is followed. Ethylene consumption is 0.84 gram (0.03 mole), and 2.16 grams of polymer is collected. The polymer has an acrylate/ethylene molar ratio: 1:3.0; Mw: $2.0 \times 10^5$; and Mn: $7.6 \times 10^3$.

We claim:

1. A process which comprises polymerizing an olefin and an acrylic monomer in the presence of an activator and a Group 8–10 late transition metal complex having an isoindoline ligand.

2. The process of claim 1 wherein the complex has the general structure:

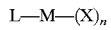

Wherein M is a Group 8–10 late transition metal, L is an isoindoline ligand, X is a labile ligand, n, the number of the X ligands, is greater than or equal to 1.

3. The process of claim 2 wherein the isoindoline ligand L has the general structure:

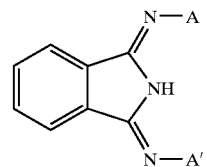

wherein A and A' are the same or different and selected from aryl or heteroaryl groups.

4. The process of claim 3 wherein A and A' are the same and are selected from aryl groups.

5. The process of claim 3 wherein A and A' are the same and are selected from heteroaryl groups.

6. The process of claim 2 wherein M is selected from the group consisting of Ni, Co, and Fe.

7. The process of claim 2 wherein M is Fe.

8. The process of claim 2 wherein X is independently selected from the group consisting of hydrogen and halides.

9. The process of claim 2 wherein X is independently selected from halides.

10. The process of claim 1 wherein the complex comprises Fe and 1,3-bis(2-mesitylimino)isoindoline ligand.

11. The process of claim 1 wherein the complex comprises Fe and 1,3-bis(2-pyridylimino)isoindoline ligand.

12. The process of claim 1 wherein the activator is selected from the group consisting of alkyl alumoxanes, alkylaluminum compounds, aluminoboronates, organoboranes, ionic borates, and ionic aluminates.

13. The process of claim 1 wherein the activator is an alumoxane.

14. The process of claim 1 wherein the olefin is selected from the group consisting of $C_{2-10}$ α-olefins, cyclic olefins, dienes, and mixtures thereof.

15. The process of claim 1 wherein the olefin is selected from the group consisting of ethylene, propylene, 1-butene, 1-pentene, 1-hexene, 1-octene, and mixtures thereof.

16. The process of claim 1 wherein the olefin is ethylene.

17. The process of claim 1 wherein the acrylic monomer is selected from the group consisting of $C_1$–$C_{20}$ alkyl acrylates, $C_1$–$C_{20}$ alkyl methacrylates, $C_6$–$C_{20}$ aryl acrylates, $C_6$–$C_{20}$ aryl methacrylates, and mixtures thereof.

18. The process of claim 1 wherein the acrylic monomer is selected from the group consisting of n-butyl acrylate, n-butyl methacrylate, methyl methacrylate, t-butyl methacrylate, iso-butyl methacrylate, benzyl methacrylate, cyclohexyl methacrylate, and mixtures thereof.

19. The process of claim 1 wherein the olefin is ethylene and the acrylic monomer is n-butyl acrylate.

\* \* \* \* \*